United States Patent [19]

Nicholson et al.

[11] Patent Number: 4,623,682

[45] Date of Patent: Nov. 18, 1986

[54] CEMENT MIXES AND ADMIXTURES THEREOF

[75] Inventors: Richard R. Nicholson, Lyndhurst; Arthur H. Gerber, Solon, both of Ohio

[73] Assignee: Sandoz Ltd., Basel, Switzerland

[21] Appl. No.: 782,682

[22] Filed: Oct. 1, 1985

[51] Int. Cl.$^4$ .................. C04B 24/18; C04B 24/22
[52] U.S. Cl. .......................... 524/3; 106/90; 524/6
[58] Field of Search ............ 524/3, 6; 106/90

[56] References Cited

U.S. PATENT DOCUMENTS

| | | | |
|---|---|---|---|
| 3,864,290 | 2/1975 | Peppler et al. | 524/6 |
| 3,931,083 | 1/1976 | Sasaki et al. | 524/3 |
| 4,088,804 | 5/1978 | Cornwell et al. | 524/6 X |
| 4,308,069 | 12/1981 | Tsuji et al. | 106/90 |
| 4,367,094 | 1/1983 | Fujimaru et al. | 106/90 |
| 4,460,720 | 7/1984 | Gaidis et al. | 524/5 |

*Primary Examiner*—Earl Nielsen
*Attorney, Agent, or Firm*—Gerald D. Sharkin; Robert S. Honor; Walter F. Jewell

[57] ABSTRACT

Cement mix, particularly concrete mixes, for high compressive strength including early compressive strength, have extended workability without substantial loss in rate of hardening when containing an admixture combination of a sulfonated naphthalene-formaldehyde condensated and fractionated sulfonated lignin, such as ultrafiltered lignosulfonate.

13 Claims, No Drawings

CEMENT MIXES AND ADMIXTURES THEREOF

BACKGROUND OF THE INVENTION

This invention relates to hydraulic cement mixes in which improved properties are obtained through reduction of the water content of the mix. More particularly, it relates to mixes comprising a superplasticizing chemical admixture with minimal slump loss and entrained air, and good hardening characteristics.

It is a basic rule of concrete technology that greater compressive strengths are obtained for a given cement content when reduced quantities of water are utilized in hydraulic cement mixes. In portland cement compositions, therefore, it is highly desirable to maintain a very low water content in order to achieve high strength in the final product. Water reduction per se, however, results in a loss of workability or fluidity of a concrete or mortar mix. It is necessary for the plastic portland cement concrete mix to have fluid properties in order to effect uniform distribution of the ingredients, pumpability to transmit the mix to the needed structural site, and flowability to permit the plastic mix to be easily consolidated in the desired form. Therefore, chemical admixtures are employed to achieve an improved concrete mix with reduced water content while maintaining adequate fluidity for ease of placement and consolidation. Chemical admixtures used to reduce water content are commonly referred to as superplasticizers or high-range water-reducing agents. Among the known materials comprising high-range water-reducing admixtures are salts of the condensation products of naphthalene sulfonate and formaldehyde, such as disclosed broadly in U.S. Pat. Nos. 2,141,569, 3,667,780 and 4,308,069. Melamine sulfonates condensed with formaldehyde are disclosed in U.S. Pat. No. 4,394,175. Salts of lignosulfonates are described in U.S. Pat. Nos. 3,767,436, 3,864,290 and 4,367,094. Often set retarders are used to control and maintain a desirable fluidity for a desired time interval. An example is noted in U.S. Pat. No. 4,290,817 issued to Villa et al on Sept. 22, 1981.

Although the use of high-range water-reducing agents in concrete mixes may be desirable in some instances, there are some undesirable properties which tend to diminish the intended function of these agents. The favorable water reduction and workability obtained in mixes which contain naphthalene sulfonate condensates or melamine sulfonate condensates often is soon lost in the early stages of mixing and placing. Mixes containing the admixtures are often designed with six to eight inch slumps. The slump test is a measurement of concrete workability and is described in ASTM C 143, Standard Test Method for Slump of Portland Cement Concrete. Initial slump of six to eight inches of concretes containing admixtures is often reduced to less than three inches within an hour after initial mixing. The loss in slump, and corresponding loss of workability, is both undesirable and unsatisfactory. When slump is lost, the addition of water has been used to restore workability. Addition of water is known as retempering which results in a concrete mix containing more water than desirable which causes a significant loss in compressive strength after hardening and a number of other problems or deficiencies. The addition of an agent which retards early hydration and extends the time of setting of the plastic mix is an alternative means of maintaining a desirable slump in mixes containing high-range water-reducing agents. However, the extended time of setting often makes use of such a combination of admixtures undesirable. Among the known water-reducing agents, the lignosulfonates also exhibit set retarding properties. Lignosulfonates, when used in an amount sufficient to furnish the desired water reduction in a mix, normally entrain more air than desired and retard the setting time of concrete far beyond the ranges for a high-range water-reducing admixture.

For many concrete applications it is desired to have a mix which is reduced in water content in order to obtain high compressive strength. It is also particularly desirable in many applications to have a concrete mix which will harden quickly so that construction work can continue as soon as possible in the immediate area in which the concrete mix was placed. It is further desirable to have a concrete mix which will remain workable for a reasonable time, eg. roughly one hour, thereby avoiding the need to waste material not promptly used or sacrifice quality in terms of compressive strength by retempering. Formulating a mix of reduced water content results, as indicated, in a loss of the desired extended workability. Compensating for this loss by means of other admixtures has not been completely satisfactory in meeting the total objective. The addition of set retarders, as also indicated, will extend workability but prolongs the rate of hardening by a time greater than the time over which the mix is workable, thus resulting in a net time loss in terms of ability to continue work at immediate area.

Lignosulfonates used by themselves as water-reducing agents are completely unsatisfactory for the contemplated purposes since the set-retarding action of these material delays the rate of hardening well beyond the time benefits obtained in terms of increased workability.

One approach in our work to provide a new and improved admixture for the contemplated purposes was to combine commonly used lignosulfonates with various other water-reducing agents, but in these investigations it was still found that the rate of hardening was unsatisfactorily delayed, and in many cases the workability was also either unsatisfactory or marginal.

An object of the present invention is to provide water-reduced hydraulic cement compositions, particularly concrete compositions, enabling more efficient time use in construction.

Another object of the invention is to provide water-reduced cement compositions of time extended workability without delaying the rate of hardening for a time period greater than the time during which the mix is workable.

A further object is to provide water-reduced cement composition which will remain workable for at least about one hour while the rate of hardening thereof is prolonged by no more than one hour or even less.

A still further object is to provide cement compositions consistent with the above objects and exhibits other desired properties such as desired air contents for forming quality, high compressive strengths cement structures.

SUMMARY OF INVENTION

In accordance with the present invention, it has been found that water soluble fractionated sulfonated lignins, preferably ultrafiltered lignosulfonates, may be combined with sulfonated naphthalene-formaldehyde condensates to provide cement compositions, particularly, concrete compositions not only having reduced water content for desired compressive strength properties but also combining the ability to remain workable for desired time periods after initial mixing without undesired prolongation in rate of hardening of the concrete, and in particular without prolonging the hardening for a time greater than the period during which the mix retains its workability by reason of such admixture combination. Hence, cement compositions in accordance with the invention comprise hydraulic cement, aggregate, water and an admixture combination containing a fractionated sulfonated lignin and a sulfonated naphthalene-formaldehyde condensate. Such water-reduced concrete compositions may be formulated in accordance with the invention to offer the advantages of remaining suitably workable for about an hour or more after initial mixing while the time of hardening is not prolonged by a time greater than the length of the workability period of the concrete mix.

DETAILED DESCRIPTION AND PREFERRED EMBODIMENT

In general, the fractionated sulfonated lignins and sulfonated naphthalene-formaldehyde will be employed in a total combined amount sufficient to obtain the desired water-reduction while imparting a workability for a period of time greater than the time the rate of hardening is prolonged by such combination. The desired water-reduction, usually a water reduction of from about 10 to 20%, more usually 12 to 18% by weight, may be achieved with from about 0.2 to 0.8% by combined weight of these two admixtures based on the weight of the cement, more usually 0.3 to 0.7% by weight. The fractionated lignosulfonate is suitably employed in an amount of from about 0.075 to 0.5% by weight based on the dry weight of the cement, preferably 0.1 to 0.35% by weight. The sulfonated naphthalene-formaldehyde condensate is suitably employed in an amount of from about 0.05 to 0.35% by weight based on the dry weight of the cement, preferably 0.075 to 0.3% by weight. Within these indicated dosages it further indicated to regulate the amount of individual admixture additives relative to each other in order to obtain desired results. Preferably, the weight ratio of the fractionated lignosulfonate to the sulfonated naphthalene condensate is within the range of from 0.7:1 to 3:1, more preferably 1:1 to 2.5:1. When formulated in accordance with the invention, water reduced concrete mixes may be produced to retain a desired level of workability as indicated by a retention of more than 60% of their initial slump at 70° F. while any lengthening in the rate of hardening does not exceed the period over which the concrete retains such workability. Readily provided by the invention are such water-reduced concrete mixes which meet the desired objective of retaining such workability for at least about 1 hour, and even considerably longer. Highly workable mixes retaining at least 70%, e.g. 70–85% of their initial slump for about 1 hour, or even more, may also be readily produced. In addition, concrete mixes may be readily produced wherein the lengthening in the rate of hardening is considerably less, e.g. one-half or less, of the time over which the mix will remain at the desired workability levels.

The sulfonated naphthalene-formaldehyde condensates employed in the invention may be any of the water soluble sulfonated naphthalene-formaldehyde condensates well known to be useful in the cement art as high range water reducing agents. Average molecular weights of such condensates may range from 700 to 10,000 daltons, and are preferably 1,000 to 5,000 daltons, more preferably 1700–3400 daltons. Naphthalene to formaldehyde mol ratios in such condensates is generally about 1:1. Such materials may be employed in free acid form but are preferably used in alkali and alkaline earth metal form, e.g. sodium and calcium salt forms. Many such materials are widely available from commercial sources.

The fractionated sulfonated lignins may be employed in the invention in free acid form but are preferably employed in the form of a salt, particularly in alkali or alkaline earth metal salt form, preferably the sodium or calcium forms. Fractionated sulfonated lignins are those obtained by treating, e.g. by solvent fractionation or ultrafiltration, the sulfonated liquor from the sulfite digestion (fermentation) of woods, e.g. soft woods, to remove lower molecular weight sulfonated lignins and other low molecular weight factors and residues. Ultrafiltration is a preferred and convenient method of producing fractionated sulfonated lignins and the ultrafiltered sulfonated lignins typically characterize the fractionated sulfonated lignins for use in the invention. In general, the ultrafiltered lignosulfonates which are water soluble are prepared in the same manner as ordinary lignosulfonates except that liquid stock containing the lignosulfonate is ultrafiltered. The ultrafiltration essentially removes lower molecular weight lignosulfonates. Other lower molecular weight factors and residues will also be removed. Membrane opening sizes for obtaining such materials may range from 5 to 75 microns, and are preferably from 10–50 microns in size, e.g. about 20 microns. Polysulfone membranes are typically employed. Weight average molecular weights of ultrafiltered lignosulfonates will vary depending upon the stock subject to ultrafiltration but typically range from 9,000 to 15,000, more typically 9,500 to 13,000, as determined by high pressure liquid size exclusion chromatography with polystyrene as a reference. Number weights are usually at least about 1450, more average molecular usually at least 1550, typically 1600–1850, whereas non-fractionated lignosulfonates have number average molecular weights less than 1350, typically 900–1300. Ultrafiltered lignosulfonates have a relatively high methoxyl content, usually greater than 9.5% by weight, more usually greater than 10%, typically 10–12%, whereas lignosulfonates which have not been ultrafiltered have methoxyl contents less than 9.0%, typically 5–8.8%. Among lower molecular weight factors and residues removed by ultrafiltration are sugars and corresponding acid analogues thereof (oxidized sugars or sugar acids), and sulfonated derivatives thereof. At least a major portion or nearly all such sugar factors are removed by ultrafiltration such that any influence of such factors in concrete mixes formed in accordance with the invention will be negligible. The content of reducing sugar (pentoses) in ultrafiltered lignosulfonates is generally less than about 3% by weight, usually less than about 2% and often not more than about 1%. Preferred ultrafiltered lignosulfonates for use in the invention are those which are predominantly in sodium or calcium salt form. Many such materials are commercially availble.

The cement compositions of the invention may be formulated and prepared in accordance with conventional practice for water-reduced concretes. Preferably, the compositions will contain hydraulic cement, particularly Portland cement, in an amount representing from 8 to 30% by weight of the total composition, preferably from 12 to 25% by weight. Aggregate is generally present in an amount representing from 200 to 800 parts by weight based on the dry weight of the cement, preferably from 300 to 700 parts by weight, more preferably 400 to 600 parts by weight. In mortars, grouts and the like, the aggregate is fine sand. Concrete aggregate is a mixture of fine and course aggregate, e.g. sand and crushed stone, preferably in a weight ratio of 30:70 to 70:30, more preferably 40:60 to 60:40. The water content of water-reduced cement compositions is preferably from 30 to 60% by weight based on the dry weight of the cement, more preferably from 35 to 55% by weight.

The sulfonated naphthalene-formaldehyde condensate and ultrafiltered lignosulfonate to be used as admixture additives may be combined with the other concrete ingredients any stage in the preparation process, but are preferably added with the initial mixing water, and in any case are thoroughly mixed and distributed in the final concrete composition.

The cement employed in the concrete is preferably Portland type cement. Various other cement additives such as pozzolanic additives including fly ash, blast furnace slag, silica fume and the like may be added. Also, other chemical admixtures which do not adversely affect the desired properties of the mix as obtained without such optional admixtures, particularly not adversely affecting workability and rate of hardening, may also be added. Included among such admixtures which may be used are set accelerators such as sodium thiocyanate and triethanolamine which may be added to increase the rate of hardening and the early compressive strength of the mix beyond the levels obtained without such optional admixtures. It is particularly desirable to avoid addition of agents having a set-retarding effect. As is known, lignosulfonates have set-retarding effects but the two component admixture of the invention involving lignosulfonates with the lower molecular weight lignosulfonates removed by ultrafiltration apparently enables an unexpected degree of control of retarding influence on cement compositions prepared in accordance with the invention. Since other factors such as sugars which may influence retardation are largely removed in ultrafiltration and since the ultrafiltered lignosulfonate is employed in such small amounts in the concrete mixes of the invention, such mixes can be indicated to be substantially free of set-retarding agents beyond the lignosulfonate itself.

Also provided by the invention are admixture or compositions useful in preparing the cement composition of the invention. Such admixtures are aqueous solutions comprising from about 3 to 30% by water soluble sulfonated naphthalene-formaldehyde condensate, preferably about 5-20% and in sodium salt form, and from about 5 to 40% by weight of water soluble fractionated sulfonated lignin, preferably ultrafiltered lignosulfonate, preferably 8 to 30% by weight and in predominantly sodium or calcium salt form. Such admixture compositions may contain other additives or admixtures for various purposes, e.g. set accelerators, which do not adversely affect workability and rate of hardening of cement compositions. Accordingly, such compositions will be substantially free of set-retarding agents.

EXAMPLES

For purposes of illustrating the advantageous results obtainable by the practice of the present invention, concrete mixes are prepared and evaluated with results shown in Table I.

All mixes are produced with 600 pounds of Type I portland cement per cubic yard of concrete and are mixed at ambient temperatures of 70° Fahrenheit. The aggregates used in each mix are the same and employed at the same weight (1425 pounds of sand and 1560 pounds of stone, both satisfying USTMC-33). The water used for each mix is adjusted to generate the desired initial slump (315 pounds of water in control mix No. 1). The ingredients are combined in a drum mixer and blended initially for 5 minutes at 20 rpm. The slump of the freshly prepared concrete mixture is measured and recorded as the "initial slump in inches". Following this determination the entire mix is agitated in the drum at 4.5 rpm for 30 minutes after which the slump value was measured. The process is repeated for 60 minutes for final slump measurement. In Table I when the same mix was prepared more than once the results are average and consolidated, and hence appear as a single mix. In Table I the abbreviations have the following meaning.

NSC—Naphthalene (formaldehyde condensate, sodium salt—Lomar D Modified (Diamond-Shamrock Co.)
ULS—Ultrafiltered lignosulfonate, sodium salt—Lignosite 889 (Georgia-Pacific Co.).
LS—Lignosulfonate, sodium salt (Georgia-Pacific Co.).
CULS—Ultrafiltered lignosulfonate, calcium salt—Lignosite 704 (Georgia-Pacific Co.)
ROH—rate of hardening—the values given are the additional times in hours required for the concrete mixes to reach initial set when compared with control concrete mix No. 1 which contains no additives, as determined by ASTM C403-80.

Compressive strengths were determined in accord with USTM C39-83.

TABLE I

| Mix No. | Ingredient and Weight, % of Cement | | SLUMP (inches) Initial | 30 Mins. | 60 Mins. | Final Slump, % of Initial Slump | Air Content | ROH | Water Reduction | Compressive Compressive Strength, 1 Day | 28 Days |
|---|---|---|---|---|---|---|---|---|---|---|---|
| 1 | None | | 6.63 | — | — | 74 | 1.6 | 0 | 0 | 1820 | 6220 |
| 2 | NSC | 0.40 | 6.5 | 4.50 | 2¼ | 40 | 3.4 | 0 | 16.8 | 2780 | 7680 |
| 3 | ULS | 0.4 | 6.6 | 6.5 | 5.7 | 84 | 7.2 | 2¼ | 14.9 | 1816 | 5765 |
| 4 | LS | 0.4 | 6.63 | 7.4 | — | 69 | 7.4 | 4½ | 15.6 | 1683 | 5862 |
| 5 | 0.25 | ULS + 0.15 NSC | 6.4 | 5.5 | 4.75 | 67.5 | 3.8 | ¼ | 14.3 | 2294 | 7047 |
| 6 | 0.20 | ULS + 0.20 NSC | 6.75 | 6.0 | 5.5 | 81 | — | ca ½ | | | |
| 7 | 0.25 | LS + 0.15 NSC | 6.38 | — | — | 59 | 3.7 | 1½ | 15.9 | 2395 | 115 |
| 8 | 0.25 | CULS + 0.15 NSC | 6.25 | — | — | 78 | 3.3 | ¼ | 15.2 | | |

The ultrafiltered sodium lignosulfonate employed in the following mixes is indicated to have the following characteristics, UV-LSA 104; methoxyl 10.72%; total sulfur 7.0%; non-sulfonate sulfur 1.1%; sulfonate sulfur 5.7%; calcium 0.57%; sodium 4.2%; reducing sugars 0.5%; total solids 95.5%.

As shown in Table I, an amount of 0.4% by weight of the cement of each of the individual components NSC (Mix No. 2), ULS (Mix No. 3) and LS (Mix No. 4) provide the desired initial slump of about 6.5 inches. The NSC exhibits an excellent water reduction and rate of hardening, proper air content and very high compressive strengths, but its final slump indicates poor workability after 1 hour. Both ULS and LS provide acceptable workability after 1 hour (ULS being particularly good) but the rate of hardening and air contents of both clearly fail to meet desired standards and the compressive strengths at both 1 and 28 days are less than the control mix (No. 1). When the NSC and ULS are combined (Mixes Nos. 5 and 6) in the same total amounts as the individual components were used (Mixes Nos. 2 and 3), it is seen that good workability after 1 hour is obtained (particularly good with Mix No. 6) along with the desired rate of hardening and good compressive strength, while air contents and water reduction also are at the desired level. When a conventional (unmodified) lignosulfonate is combined with the sulfonated naphthalene-formaldehyde condensate as in Mix No. 7, the desired rate of hardening fails to be achieved and workability at 1 hour is marginal. Mix No. 8 demonstrates the invention using the calcium salt of ultrafiltered lignosulfonate and produces very good results. In all of the Mixes Nos. 5, 6 and 8 the important parameter of rate of hardening not only meets objectives but in general achieves a level not to be predicted from its individual components when used alone.

What is claimed is:

1. In a water-reduced cement mix comprising hydraulic cement, aggregate, water and high range water-reducing agent; the improvement comprising employing therein as high range water-reducing agent an admixture combination of a sulfonated naphthalene-formaldehyde condensate and fractionated sulfonated lignin in combined amounts sufficient to maintain the mix workable, as indicated by exhibiting more than 60% of its original slump, for a time period greater than the time the rate of hardening is prolonged by such admixture combination.

2. A water-reduced concrete mix in accordance with claim 1 in which the fractionated sulfonated lignin is ultrafiltered lignosulfonate, the combined amount of sulfonated naphthalene-formaldehyde condensate and ultrafiltered lignosulfonate is from 0.2 to 0.8% by weight based on the dry weight of the cement, the sulfonated naphthalene-formaldehyde condensed is present in an amount of from 0.05 to 0.35% by weight based on the dry weight of the cement, the ultrafiltered lignosulfonate is present in an amount of from 0.075 to 0.5% by weight based on the dry weight of the cement, the weight ratio of said lignosulfonate to said condensate is within the range of from 0.7:1 to 3:1 and in which the workability of the mix is maintained for at least about 1 hour.

3. A water-reduced concrete mix in accordance with claim 2 in which the ultrafiltered lignosulfonate is predominantly in sodium salt form.

4. A water-reduced concrete mix in accordance with claim 2 in which the ultrafiltered lignosulfonate is predominantly in calcium salt form.

5. A water-reduced concrete mix in accordance with claim 2 in which the combined amount of sulfonated naphthalene-formaldehyde condensate and ultrafiltered lignosulfonate is from 0.3 to 0.7% by weight based on the dry weight of the cement, the sulfonated naphthalene-formaldehyde condensed is present in an amount of from 0.075 to 0.3% by weight based on the dry weight of the cement, the ultrafiltered lignosulfonate is present in an amount of from 0.1 to 0.35% by weight based on the dry weight of the cement, the weight ratio of said lignosulfonate to said condensate is within the range of from 1:1 to 2.5:1 and in which the workability of the mix is maintained for at least about 1 hour.

6. A water-reduced concrete mix in accordance with claim 5 in which the ultrafiltered lignosulfonate is predominantly in sodium salt form.

7. A water-reduced concrete mix in accordance with claim 5 in which the ultrafiltered lignosulfonate is predominantly in calcium salt form.

8. A water-reduced concrete mix in accordance with claim 5 in which the sulfonated naphthalene-formaldehyde is in sodium salt form.

9. An admixture for use reducing the water content of concrete mixes comprising an aqueous solution containing from about 3 to 30% by total weight of sulfonated naphthalene-formaldehyde condensate and from about 5 to 40% by total weight of fractionated sulfonated lignin.

10. An admixture in accordance with claim 9 comprising from 5-20% by weight of sulfonated naphthalene-formaldehyde condensate and from 8 to 30% by weight of ultrafiltered lignosulfonate in sodium or calcium salt form.

11. An admixture in accordance with claim 10 in which said condensate is in sodium form.

12. An admixture in accordance with claim 11 in which said lignosulfonate is predominantly in sodium salt form.

13. An admixture in accordance with claim 11 in which said lignosulfonate is predominantly in calcium salt form.

* * * * *